(12) United States Patent
Bonja

(10) Patent No.: US 6,928,225 B2
(45) Date of Patent: Aug. 9, 2005

(54) METHOD AND ASSEMBLY FOR MOUNTING AT LEAST ONE OPTICAL FIBER

(75) Inventor: Jeffrey A. Bonja, Sturbridge, MA (US)

(73) Assignee: Schott Glas, Mainz (DE)

( * ) Notice: Subject to any disclaimer, the term of this patent is extended or adjusted under 35 U.S.C. 154(b) by 336 days.

(21) Appl. No.: 10/114,972

(22) Filed: Apr. 3, 2002

(65) Prior Publication Data

US 2002/0168169 A1 Nov. 14, 2002

Related U.S. Application Data

(60) Provisional application No. 60/281,278, filed on Apr. 3, 2001.

(51) Int. Cl.⁷ ................................. G02B 6/42
(52) U.S. Cl. .................. 385/137; 385/88; 385/76
(58) Field of Search ................ 385/76–90, 100, 385/136–138, 147

(56) References Cited

U.S. PATENT DOCUMENTS

| | | | |
|---|---|---|---|
| 5,109,460 A | * 4/1992 | Baek et al. ................. 385/115 |
| 5,281,884 A | 1/1994 | Basavanhally et al. |
| 5,365,049 A | 11/1994 | Peng |
| 5,448,662 A | * 9/1995 | Kittell et al. ................. 385/25 |
| 5,556,808 A | 9/1996 | Williams et al. |
| 5,682,453 A | * 10/1997 | Daniel et al. ................. 385/99 |
| 5,748,827 A | 5/1998 | Holl et al. |
| 5,889,270 A | 3/1999 | van Haagen et al. |
| 5,920,200 A | 7/1999 | Pendse et al. |
| 5,936,224 A | 8/1999 | Shimizu et al. |
| 5,939,700 A | 8/1999 | Ackley |
| 5,965,863 A | 10/1999 | Parker et al. |
| 6,098,887 A | 8/2000 | Figarella et al. |
| 6,120,193 A | * 9/2000 | Luther et al. ................. 385/99 |
| 6,189,792 B1 | 2/2001 | Heske, III |
| 6,435,733 B1 | * 8/2002 | Parat et al. ................... 385/88 |
| 6,738,545 B1 | * 5/2004 | Purchase et al. .............. 385/37 |

* cited by examiner

Primary Examiner—Joseph Williams
Assistant Examiner—Dalei Dong
(74) Attorney, Agent, or Firm—Volpe and Koenig, P.C.

(57) ABSTRACT

An assembly for mounting at least one optical fiber including a mounting frame defining a passageway therethrough. A fiber assembly plate generally defines a plane generally perpendicular to an axis of the at least one optical fiber and has a perimeter. The fiber assembly plate receives the at least one optical fiber. A mounting mechanism is disposed at a fixed location on the mounting frame and supports the fiber assembly plate over the at least one passageway. The mounting mechanism allows generally planar thermal expansion and/or contraction of the fiber assembly plate. A method of positioning at least one optical fiber in optical communication with an optical component using an athermal mount is also disclosed herein.

22 Claims, 1 Drawing Sheet

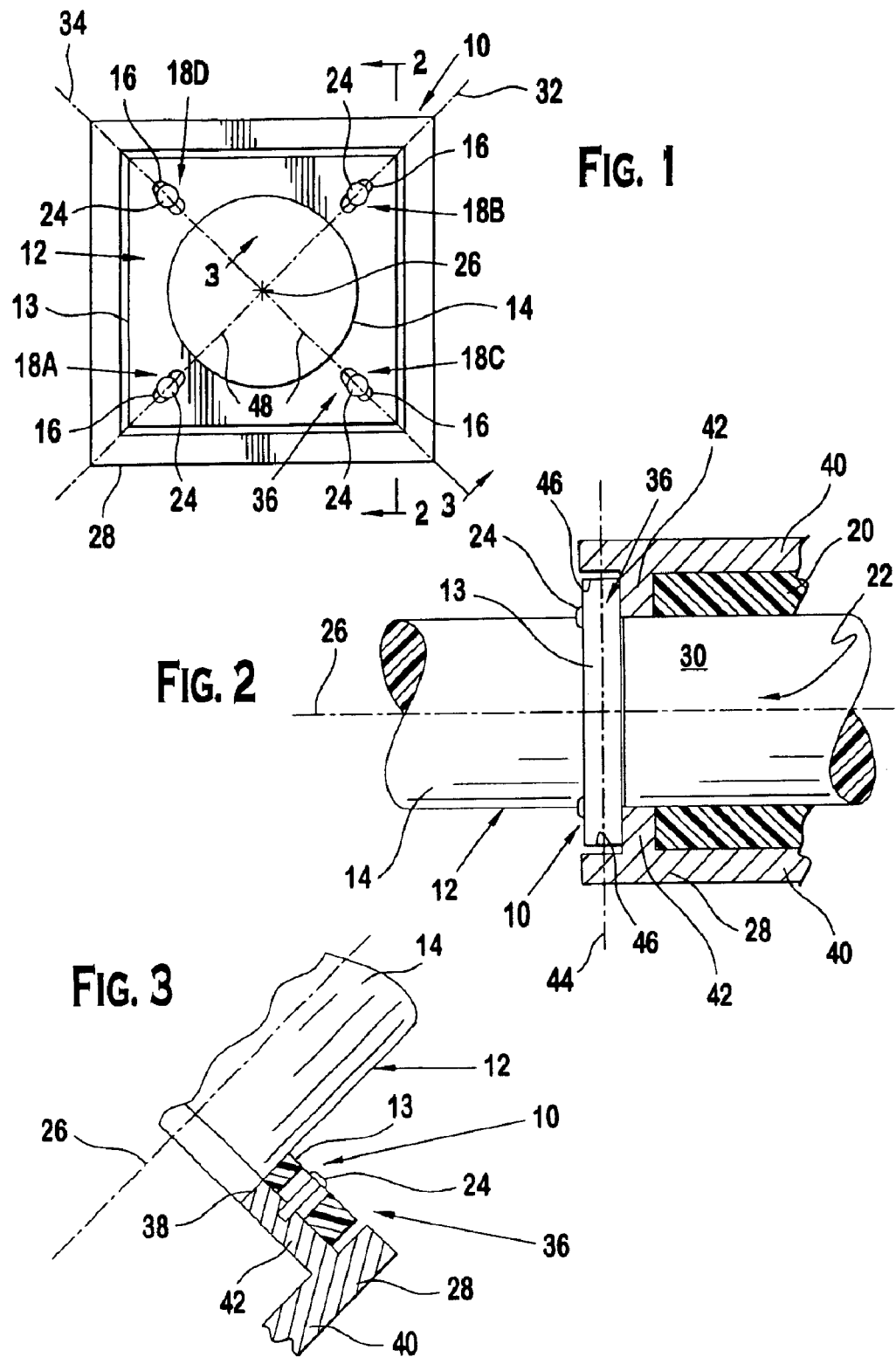

METHOD AND ASSEMBLY FOR MOUNTING AT LEAST ONE OPTICAL FIBER

CROSS-REFERENCE TO RELATED APPLICATION

This application claims priority from and benefit of U.S. Provisional Patent Application No. 60/281,278, filed Apr. 3, 2001, entitled "Athermal Fiber Array Design" which is hereby incorporated by reference herein as if fully set forth.

BACKGROUND

The present invention relates to the mounting of at least one optical fiber proximate to an optical component to establish optical communication therebetween and, more specifically, to a method and assembly for mounting at least one optical fiber using a mount that is preferably athermal.

Fiber optic technology is widely used in today's telecommunication and computer networks. One important aspect of fiber optic technology is the interconnection of optical components, such as semiconductor lasers, photo-detectors, light emitters, optical fibers, Vertical-Cavity Surface-Emitting Lasers and the like, wherein the optical components either receive light signals from the optical fibers or the optical components emit light signals into the fibers. A good optical interconnect between an optical fiber and an optical component requires accurate alignment between the optical fibers and the optical component(s). To properly align optical fibers with optical components, housings or mountings are typically used. Such mountings are properly aligned proximate to the optical component and secure the optical fiber in the proper position relative to the component.

One drawback to using mountings to secure an optical fiber is that such mountings have a different coefficient of thermal expansion than the optical fibers that are secured therein. This causes the optical fibers to be put under a compressive or tensile stress that can result in an alignment error between the optical fibers and the optical component which results in signal degradation.

Clearly, what is needed is a method and assembly for mounting at least one optical fiber that allows generally uniform expansion and/or reduction of the portion of the assembly (preferably in proportion to that of the optical fiber) that receives the optical fiber to significantly reduce alignment error resulting from ambient or localized temperature fluctuations.

SUMMARY

One embodiment of the present invention is directed to an assembly for mounting at least one optical fiber including a mounting frame that defines a passageway therethrough. A fiber assembly plate generally defines a plane generally perpendicular to an axis of the at least one optical fiber and has a perimeter. The fiber assembly plate receives that at least one optical fiber. A mounting mechanism is disposed in a fixed location on the mounting frame and supports the fiber assembly plate over at least part of the passageway. The mounting mechanism allows generally outwardly planar thermal expansion of the fiber assembly plate generally uniformly from the axis of the at least one fiber along the perimeter of the fiber assembly plate.

In another aspect, the present invention is directed to a method of positioning at least one optical fiber in optical communication with an optical component using an athermal mount. The method includes: positioning a mounting frame proximate to an optical component such that a passageway is defined by the mounting frame and is aligned with the optical component; slidably mounting a fiber assembly plate, that generally defines a plane perpendicular to an axis of the at least one optical fiber and has a perimeter, on the mounting frame so that the fiber assembly plate can thermally expand in a generally outward planar manner substantially uniformly from the axis of the at least one optical fiber along the perimeter of the plate; and engaging the at least one optical fiber with the fiber assembly plate such that the at least one optical fiber is alignable with the optical component.

In another aspect, the present invention is directed to an assembly for mounting at least one optical fiber including a mounting frame that defines a passageway therethrough. A fiber assembly plate generally defines a plane and is generally perpendicular to an axis of the at least one optical fiber and has a perimeter. The fiber assembly plate receives the at least one optical fiber. A mounting mechanism is disposed in a fixed location on the mounting frame and supports the fiber assembly plate over at least part of the passageway. The mounting mechanism allows generally inwardly directed planar thermal contraction of the fiber assembly plate generally uniformly toward the axis of the at least one fiber.

In another aspect, one embodiment of the present invention is directed to a method of positioning at least one optical fiber in optical communication with an optical component using an athermal mount. The method includes: positioning a mounting frame proximate to an optical component such that a passageway defined by the mounting frame is aligned with the optical component; slidably mounting a fiber assembly plate, that generally defines a plane perpendicular to an axis of the at least one optical fiber and has a perimeter, on the mounting frame so that the fiber assembly plate can thermally contract in a generally inward planar manner substantially uniformly toward the axis of the at least one optical fiber; and engaging the at least one optical fiber with the fiber assembly plate such that the at least one optical fiber is alignable with the optical component.

BRIEF DESCRIPTION OF THE SEVERAL VIEWS OF THE DRAWINGS

The foregoing summary, as well as the following detailed description of the preferred embodiment of the present invention will be better understood when read in conjunction with the appended drawings. For the purpose of illustrating the invention, there are shown in the drawings an embodiment which is presently preferred. It is understood, however, that the invention is not limited to the precise arrangement and instrumentality shown. In the drawings:

FIG. 1 is a front elevational view of an assembly for at least one optical fiber according to the preferred embodiment of the present invention;

FIG. 2 is a side elevational view of the assembly of FIG. 1; and

FIG. 3 is a cross-sectional view of the assembly of FIG. 1 as taken along the line 3—3 of FIG. 1.

DETAILED DESCRIPTION OF THE PREFERRED EMBODIMENT

Certain terminology is used in the following description for convenience only and is not limiting. The words "right," "left," "upper," and "lower" designate directions in the drawings to which reference is made. The words "inwardly" and "outwardly" refer to directions toward and away from, respectively, the geometric center of the assembly and designated parts thereof. The term "at least one optical fiber" includes a single optical fiber, multiple optical fibers, a fiber optic cable, an optical fiber array, an optical wave guide and the like. The terminology includes the words above specifically mentioned, derivatives thereof and words of similar import. Additionally, the words "a" and "one" are defined as including one or more of the referenced item unless specifically stated otherwise.

Referring to FIGS. 1–3, wherein like numerals indicate like elements throughout, a preferred embodiment of an assembly for at least one optical fiber according to the present invention is shown and generally designated as 10. Briefly stated, the mount preferably avoids inward and outward radial stresses on the at least one optical fiber 12 by using a fiber assembly plate 13 having a coefficient of thermal expansion approximately equal to that of the at least one fiber 12. The unique mounting mechanism 36 allows the fiber assembly plate that receives the at least one optical fiber 12 to uniformly expand outwardly and/or contract inwardly to reduce stress between the at least one optical fiber 12 and the assembly 10 to acceptable tolerance levels that avoid alignment error between the at least one optical fiber 12 and an optical component 30.

While the illustrated at least one fiber 12 has a generally circular cross-section, those of ordinary skill in the art will appreciate that the cross-sectional shape of the at least one fiber 12 can be varied without departing from the scope of the present invention. An assembly for mounting the at least one fiber 12 includes a mounting frame 28 which defines a passageway 38 therethrough. While the preferred mounting frame 28 has a generally square shape, those of ordinary skill in the art will appreciate from this disclosure that the mounting frame 28 can have a triangular, a circular an oblong, and a regular shape or the like without departing from the scope of the present invention.

It is preferred that the mounting plate 28 include a sheath 40 which extends around the perimeter of the assembly 10. The mounting frame 28 preferably includes a shoulder 42 which extends generally inwardly from the sheath 40 proximate to the at least one fiber 12 receiving side of the assembly 10. The shoulder 42 forms a seating surface for the fiber assembly plate 13.

The fiber assembly plate 13 generally defines a plane that is generally perpendicular to an axis 26 of the at least one fiber 12 and has a perimeter 46. The term "generally perpendicular" is defined as at least one fiber 12 having an axis 26 that are askew from perpendicular with the plane 44 of the fiber assembly plate 28 by no more than 15 degrees. The fiber assembly plate 28 receives the at least one fiber 12. It is preferred, but not necessary, that the at least one fiber 12 and the fiber assembly plate 28 generally have a coefficient of thermal expansion that is approximately equal. The fiber assembly plate 28 preferably includes a plurality of slots 16 therein. In the preferred embodiment, four slots 16 are positioned in the fiber assembly plate as further described below. However, those of ordinary skill in the art will appreciate that a different number of slots 16 (either more or less) can be used without departing from the scope of the present invention. It is preferred that each of the slots 16 has a longitudinal axis 48 that intersects the axis 26 of the at least one fiber 12.

A mounting mechanism 36 is disposed in a fixed location on the mounting frame 28 and supports the fiber assembly plate 13 over at least part of the passageway 38. The mounting mechanism preferably includes a plurality of pins 24 each positioned on the mounting frame 28 and the slots 16 through the fiber assembly plate. Each one of the slots 16 receives one of the pins 24 to form a connection 18A–18D. The mounting mechanism 36 allows generally outwardly directed planar thermal expansion (and/or generally inwardly directed planar thermal contraction) of the fiber assembly plate 13 generally uniformly from the axis 26 of the at least one fiber 12 along the perimeter 46 of the fiber assembly plate 13. While in some cases the thermal expansion will not be exactly identical in all directions due to the specific geometric shape of the fire assembly plate 13, those of ordinary skill in the art will appreciate that the term "generally uniformly" includes fiber assembly plates 13 that may have specific locations that very slightly in expansion due to the specific shape of the fiber assembly plate at that point (such as at an apex or concavity in the fiber assembly plate 13) without departing from the scope of the present invention.

The assembly 10 preferably, but not necessarily, includes first, second, third and fourth connections 18A–18D. The first and second connections 18A, 18B are preferably positioned along a first transverse axis of the at least one optical fiber 12 on opposing sides of the fiber assembly plate 13. This results in the two connections being positioned approximately one-hundred eighty (180) degrees apart as measured from the axis 26 of the at least one optical fiber 12.

It is preferred, but necessary, that the third connection 18C is positioned on the fiber assembly plate 13 with a longitudinal axis 48 thereof oriented generally perpendicular to the first transverse axis 32. It is also preferred that the first, second and third connections 18A–18C be located at approximately ninety (90) degree intervals as measured from the axis 26 of the at least one optical fiber 12. It is also preferred that the third and fourth connections 18C, 18D be positioned along a second transverse axis 34 of the at least one optical fiber 12.

It is preferred that the first, second, third and fourth connections 18A–18D are generally equally spaced from the axis 26 of the at least one optical fiber 12. It is also preferred that the first and second transverse axises 32, 34 are generally perpendicular to each other. Referring to FIG. 2, the mounting frame 28 is preferably engaged with a body 20 having a receptacle 22 adapted to support an optical component. The optical component is preferably at least one of an optical fiber, a fiber array, an optical waveguide, an optical detector, an optical emitter, and a vertical-cavity surface-emitting laser or the like.

A method of positioning at least on optical fiber 12 an optical communication with an optical component 30 using an athermal mount 10 according to the present invention includes positioning a mounting frame 28 proximate to an optical component 30 such that a passage way 38 is defined by the mounting frame 28 if aligned with the optical component 30. The method of the present invention includes slidably mounting a fiber assembly plate 13, that generally defines a plane 44 perpendicular to an axis 26 of the at least one optical fiber 12 and has a perimeter 46, on the mounting frame 28 so that the fiber assembly plate 13 can thermally expand in a generally outward planar manner substantially uniformly from the axis 26 of the at least one optical fiber 12 along the perimeter 46 of the fiber assembly plate 13 (and, in the alternative, so that the fiber assembly plate can thermally contract in a generally inward planar manner). The method of the present invention includes engaging the at least one optical fiber 12 with the fiber assembly plate 13 such that the at least one optical fiber 12 is alignable with the optical component 30. The method of the present invention preferably includes the fiber assembly plate 13 having a coefficient of thermal expansion approximately equal to that of the at least one optical fiber 12.

One embodiment of the present invention operates as follows. An assembly for at least one optical fiber(which is preferably, but not necessarily, an athermal mount) 10 is positioned on a body 20 in alignment with an optical component 30. A fiber assembly plate 13 is slidably mounted on the mounting frame 28 via first through fourth connections 18A–18D. The connections 18A–18D are preferably positioned along perpendicular axises 32, 34 and equidistantly positioned to the axis 26 of the at least one fiber 12 to allow generally uniform expansion or contraction (outwardly or inwardly) of the fiber assembly plate 13. While not necessary, the sheath 40 preferably extends generally around the perimeter 46 of the fiber assembly plate with a gap positioned therebetween to allow expansion.

This unique assembly 10 for an optical fiber 12 can be used to provide an athermal mount that prevents alignment errors resulting from differences in the coefficients of thermal expansion between the at least one optical fiber 12 and the assembly 10. This results in superior performance and signal transfer in optical systems using the assembly 10 of the present invention. It is recognized by those skilled in the art, that changes may be made to the above described embodiment of the invention without departing from the broad inventive concept thereof. It is understood, therefore, that this invention is not limited to the particular embodiment disclosed, but is intended to cover all modifications which are within the spirit and scope of the invention as defined by the appended claims.

I claim:

1. An assembly for athermally mounting at least one optical fiber, comprising:
    a mounting frame defining a passageway therethrough;
    a fiber assembly plate generally defining a plane generally perpendicular to an axis of the at least one optical fiber and having a perimeter, wherein the fiber assembly plate receives the at least one optical fiber; and
    a mounting mechanism disposed in a fixed location on the mounting frame which supports the fiber assembly plate over at least part of the passageway, the mounting mechanism allowing generally outwardly directed planar thermal expansion of the fiber assembly plate generally uniformly from the axis of the at least one fiber along the perimeter of the fiber assembly plate such that the assembly provides an athermal optical fiber mount that compensates for cross sectional thickness changes in the optical fiber due to temperature chances.

2. The assembly of claim 1, wherein the at least one optical fiber and the fiber assembly plate generally have a coefficient of thermal expansion that is approximately equal.

3. The assembly of claim 1, wherein the mounting mechanism comprises:
    a plurality of pins each positioned on the mounting frame;
    a plurality of slots through the fiber assembly plate, each one of the plurality of slots receiving one of the plurality of pins to form a connection.

4. The assembly of claim 3, wherein each of the plurality of slots has a longitudinal axis that intersects the axis of the at least one optical fiber.

5. The assembly of claim 3, wherein the assembly includes first, second, and third connections, the first and second connections being positioned along a first transverse axis of the at least one optical fiber on opposing sides of the fiber assembly plate.

6. The assembly of claim 5, wherein the third connection is positioned on the fiber assembly plate with a longitudinal axis thereof oriented generally perpendicular to the first transverse axis.

7. The assembly of claim 5, wherein the first, second, and third connections are located at ninety (90) degree intervals as measured from the axis of the at least one optical fiber.

8. The assembly of claim 3, wherein the assembly includes two connections positioned approximately one hundred eighty (180) degrees apart as measured from the axis of the at least one optical fiber.

9. The assembly of claim 3, further comprising first, second, third, and fourth connections, the first and second connections being positioned along a first transverse axis of the at least one optical fiber, the third and fourth connections being positioned along a second transverse axis of the at least one optical fiber.

10. The assembly of claim 9, wherein the first, second, third, and fourth connections are generally equally spaced from the axis of the at least one optical fiber.

11. The assembly of claim 10, wherein the first and second transverse axes are generally perpendicular to each other.

12. The assembly of claim 1, wherein the mounting frame is engaged with a body having a receptacle adapted to support an optical component.

13. The assembly of claim 12, wherein the optical component is at least one of an optical fiber, a fiber array, an optical detector, and an optical emitter.

14. A method of positioning at least one optical fiber in optical communication with an optical component using an athermal mount, the method comprising:
    positioning a mounting frame proximate to an optical component such that a passageway defined by the mounting frame is aligned with the optical component;
    slidably mounting a fiber assembly plate, that generally defines a plane perpendicular to an axis of the at least one optical fiber and has a perimeter, on the mounting frame so that the fiber assembly plate can thermally expand in a generally outward planar maimer substantially uniformly from the axis of the at least one optical fiber along the perimeter of the plate, the fiber assembly plate provides an athermal optical fiber mount that compensates for cross sectional thickness changes in the optical fiber due to temperature chances; and
    engaging the at least one optical fiber with the fiber assembly plate such that the at least one optical fiber is alignable with the optical component.

15. The method of claim 14, wherein the step of slidably mounting comprises mounting the fiber assembly plate having a coefficient of thermal expansion approximately equal to that of the at least one optical fiber.

16. An assembly for athermally mounting at least one optical fiber, comprising:
    a mounting frame defining a passageway therethrough;
    a fiber assembly plate generally defines a plane generally perpendicular to an axis of the at least one optical fiber and having a perimeter, the fiber assembly plate receives the at least one optical fiber; and
    a mounting mechanism disposed in a fixed location on the mounting frame supports the fiber assembly plate over at least part of the passageway, the mounting mechanism allowing generally inwardly directed planar thermal contraction of the fiber assembly plate generally uniformly toward the axis of the at least one fiber such that the assembly provides an athermal optical fiber mount that compensates for cross sectional thickness changes in the optical fiber due to temperature changes.

17. The assembly of claim 16, wherein the at least one optical fiber and the fiber assembly plate generally have a coefficient of thermal expansion that is approximately equal.

18. The assembly of claim 16, wherein the mounting mechanism comprises:
   a plurality of pins each positioned on the mounting frame;
   a plurality of slots through the fiber assembly plate, each one of the plurality of slots receives one of the plurality of pins to form a connection.

19. The assembly of claim 18, further comprising first, second, third, and fourth connections, the first and second connections being positioned along a first transverse axis of the at least one optical fiber, the third and fourth connections being positioned along a second transverse axis of the at least one optical fiber.

20. A method of positioning at leant one optical fiber in optical communication with an optical component using an athermal mount, the method comprising:
   positioning a mounting frame proximate to an optical component such that a passageway defined by the mounting frame is aligned with the optical component;
   slidably mounting a fiber assembly plate, that generally defines a plane perpendicular to an axis of the at least one optical fiber and has a perimeter, on the mounting frame so that the fiber assembly plate can thermally contract in a generally inward planar manner substantially uniformly toward the axis of the at least one optical fiber such that the fiber assembly plate provides an athermal optical fiber mount that compensates for cross sectional thickness changes in the optical fiber due to temperature changes; and
   engaging the at least one optical fiber with the fiber assembly plate such that the at least one optical fiber is alignable with the optical component.

21. The method of claim 20, wherein the step of slidably mounting comprises mounting the fiber assembly plate having a coefficient of thermal expansion approximately equal to that of the at least one optical fiber.

22. A method of manufacturing an athermal optical fiber mount, the method comprising:
   providing a mounting frame configured for installation in optical communication with an optical component; and
   slidably mounting a fiber assembly plate, that generally defines a plane perpendicular to an axis of the at least one optical fiber and has a perimeter, on the mounting frame so that the fiber assembly plate can thermally expand in a generally outward planar manner substantially uniformly from the axis of the at least one optical fiber along the perimeter of the plate so that the fiber assembly plate provides an athermal optical fiber mount that compensates for cross sectional thickness changes in the optical fiber due to temperature changes.

* * * * *